(12) United States Patent
Gan et al.

(10) Patent No.: US 7,628,371 B2
(45) Date of Patent: Dec. 8, 2009

(54) ADJUSTABLE STAND FOR DISPLAY DEVICES

(75) Inventors: Wen-Lin Gan, Shenzhen (CN); Tie-Zhu Wang, Shenzhen (CN)

(73) Assignees: Hon Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/171,261

(22) Filed: Jul. 10, 2008

(65) Prior Publication Data

US 2009/0179133 A1 Jul. 16, 2009

(30) Foreign Application Priority Data

Jan. 16, 2008 (CN) .................. 2008 1 0300104

(51) Int. Cl.
*F16M 13/00* (2006.01)
(52) U.S. Cl. .................. 248/422; 248/162.1; 248/917
(58) Field of Classification Search .............. 248/422, 248/132, 161, 162.1, 404, 157, 917, 922; 361/679.01, 679.02
See application file for complete search history.

(56) References Cited

U.S. PATENT DOCUMENTS

| | | | | |
|---|---|---|---|---|
| 6,918,564 | B2* | 7/2005 | Yen et al. ................ | 248/404 |
| 2007/0205340 | A1* | 9/2007 | Jung .................. | 248/125.9 |
| 2007/0205341 | A1* | 9/2007 | Chih et al. ............. | 248/125.9 |
| 2007/0217134 | A1* | 9/2007 | Shin .................... | 361/681 |
| 2007/0262210 | A1* | 11/2007 | Oh et al. ............... | 248/125.1 |
| 2008/0099637 | A1* | 5/2008 | Pai ..................... | 248/157 |

* cited by examiner

*Primary Examiner*—Ramon O Ramirez
(74) *Attorney, Agent, or Firm*—Zhigang Ma

(57) ABSTRACT

An exemplary adjustable stand (20) for displays includes a main support (22), a movable rack (25), an adjusting system (26) and a balance mechanism (28). The movable rack is slidably mounted on the main support. The adjusting system includes at least one pinion gear (266) rotatably attached on the movable rack and at least one rack gear (267) fixed to the main support. The at least one pinion gear meshes with the at least one rack gear. The balance mechanism is mounted between the main support and the movable rack for balancing gravity of the movable rack and components fixed relative to the movable rack. The present invention further discloses a stand (10) including a support bracket (30), a base (40) and the adjustable stand for connecting the support and the base.

14 Claims, 4 Drawing Sheets

ADJUSTABLE STAND FOR DISPLAY DEVICES

BACKGROUND OF THE INVENTION

1. Field of the Invention

The present invention relates generally to adjustable stands for display devices, more particularly to an adjustable stand for height-adjustable supporting a display device.

2. Discussion of the Related Art

Presently, flat-panel display devices such as liquid crystal display (LCD) devices are widely used due to excellent display quality and their thin bodies. Typically, a function of adjusting an altitude of the flat display device can be realized via a support stand having an adjustable stand.

Referring to FIG. 4, a typical adjustable stand for adjusting an altitude of a flat-panel display device includes a support member 5, an elevating member 6, a coil spring 7, a shaft 71, and four fastening members 73 and 76. The support member 5 includes a base plate 50 and two side plates 51 perpendicularly extended from opposite sides of the base plate 50. A flange 53 is formed around an end of each side plate 51 opposite to the base plate 50. The base plate 50, the side plates 51, and the flanges 53 cooperatively define a receiving groove 54. Two guide rails 55 are formed on the inner surfaces of two side plates 51 correspondingly. Each of the flanges 53 defines a fixing hole 531 adjacent to an end. The elevating member 6 has a connecting portion 61 for connecting the LCD panel on a top side, and defines two positioning holes 62 at a bottom side. The elevating member 6 forms two sliding portions 63 for engaging with the guide rails 55. The shaft 71 defines two through holes 711 in opposite ends. An end of the spring 7 is sleeved on the shaft 71, and another end of the spring 7 defines two through holes 75.

In assembling of the stand 100, the elevating member 6 is inserted into the support member 5, with the sliding portions 63 of the adjustable stand 6 engaging in the guide rails 55 of the support member 5. Each fastening member 33 extends through one corresponding through hole 711 of the shaft 71 and one corresponding fixing hole 531 of the flanges 53, thus fixing the shaft 71 to the support member 5. Each fastening member 73 extends through one corresponding through hole 75 of the spring 7 and one corresponding positioning hole 62 of the elevating member 6, thus fixing the spring 7 to the elevating member 5. In use, the elevating member 6 can be driven to slide relative to the support member 5 by an external force. When the external force is released, the liquid crystal display panel connected to the elevating member 6 can be remained in a predetermined position, due to a balance of a weight of the liquid crystal display panel and the elevating member 6, an elastic force of the spring 7, and a friction force between the elevating member 6 and the support member 5.

However, a friction force between the elevating member 6 and the support member 5 is great since the contacting area of them is large, thus a user may need to exert great effort to push the elevating member 6 to slide relative to the support member 5.

Therefore, an adjustable stand for display devices to solve the aforementioned problems is desired.

SUMMARY

An exemplary adjustable stand for displays includes a main support, a movable rack, an adjusting system and a balance mechanism. The movable rack is slidably mounted on the main support. The adjusting system includes at least one pinion gear rotatably attached on the movable rack and at least one rack gear fixed to the main support. The at least one pinion gear meshes with the at least one rack gear. The balance mechanism is mounted between the main support and the movable rack for balancing gravity of the movable rack and components fixed relative to the movable rack.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the adjustable stand for flat display devices. Moreover, in the drawings, like reference numerals designate corresponding parts throughout the several views.

DETAILED DESCRIPTION OF THE EMBODIMENTS

Figure 1:
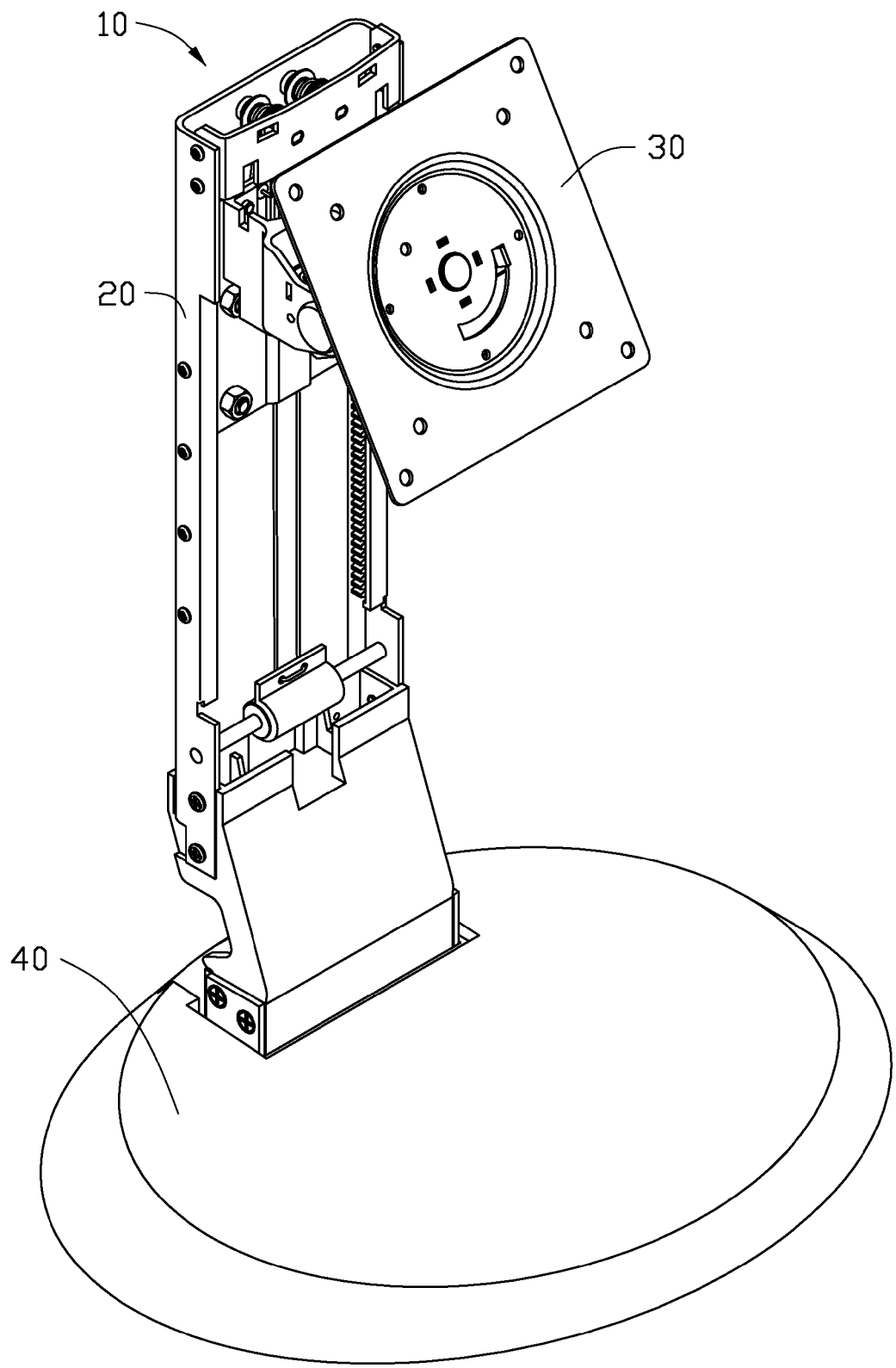
FIG. 1 is an assembled, isometric view of a stand for display device employed in a flat-panel display device in accordance with a preferred embodiment of the present invention.

A stand according to an exemplary embodiment is adapted for use in a flat-panel display device such as a liquid crystal display device. Referring to FIG. 1, a support stand 10 includes an adjustable stand 20, a support bracket 30 for mounting a liquid crystal display panel (not shown), and a base 40 for supporting the adjustable stand 20. The adjustable stand 20 is adjustably connected to the support bracket 30 and the base 40.

Figure 2:
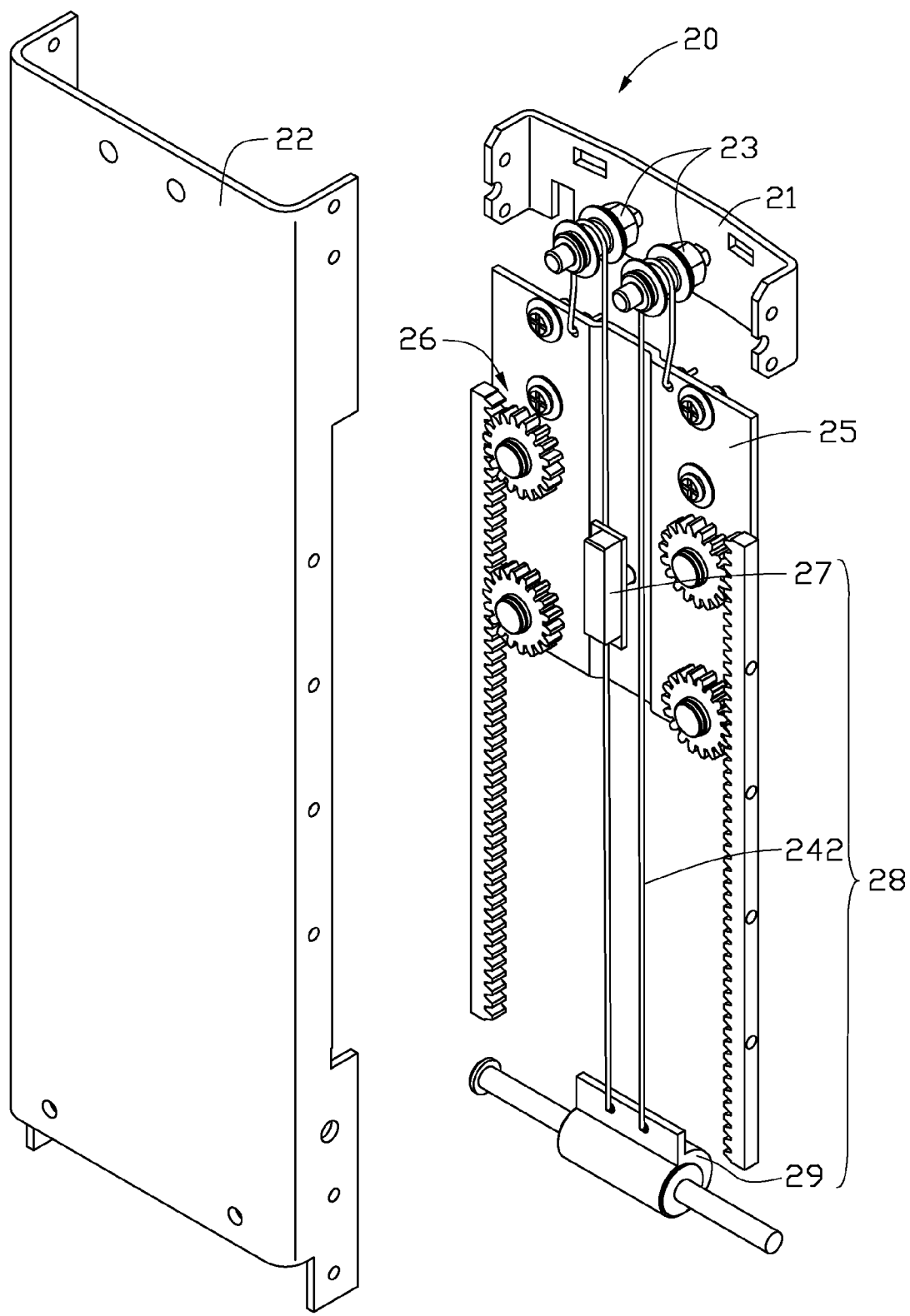
FIG. 2 is a partially assembled, isometric view of an adjustable stand for flat-panel display device of FIG. 1.

Referring to FIG. 2, the adjustable stand 20 includes an upper support 21, a main support 22, a movable rack 25, an adjusting system 26, and a balance mechanism 28.

Figure 3:
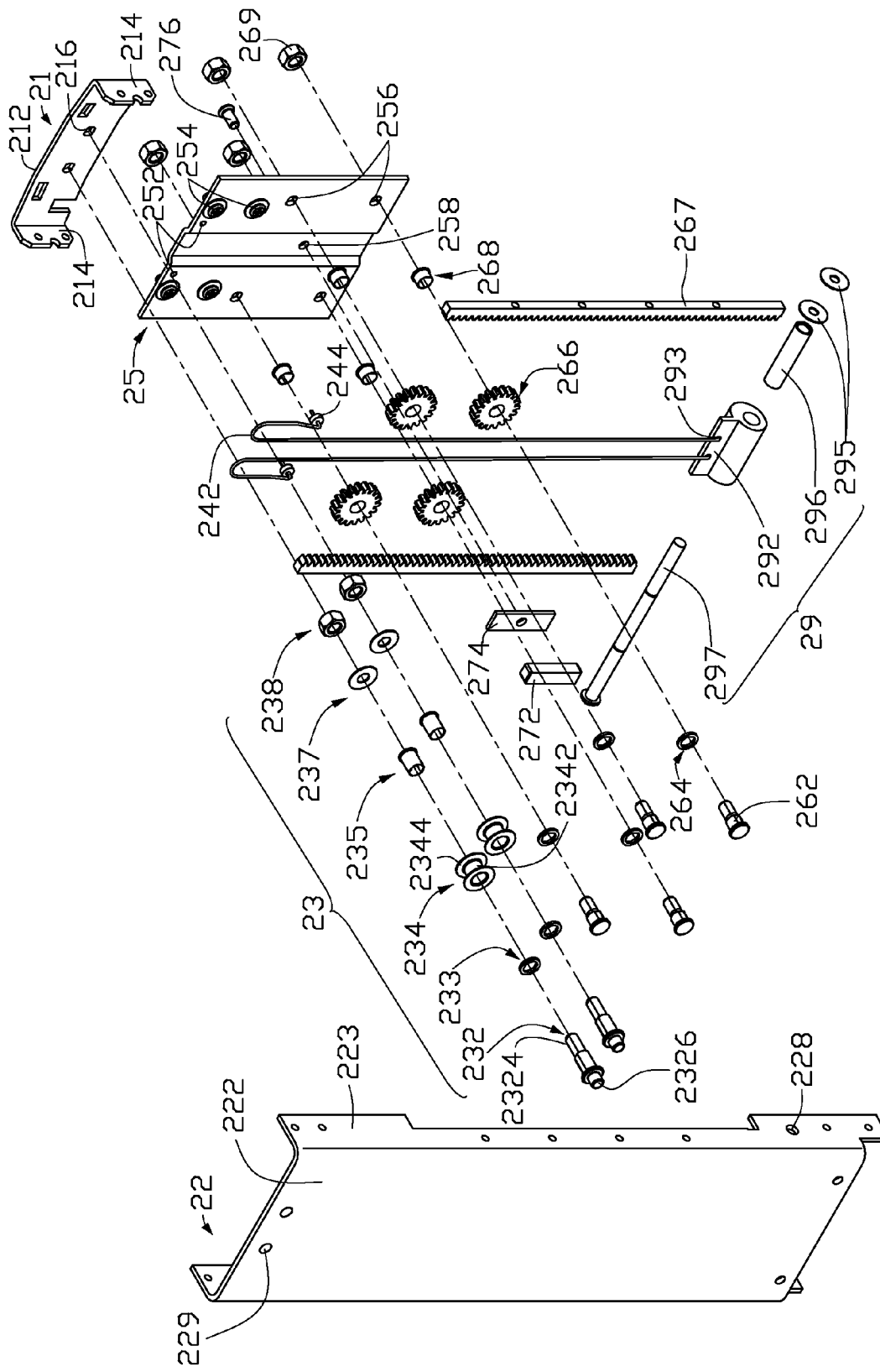
FIG. 3 is an exploded, isometric view of the adjustable stand for flat-panel display device of FIG. 2.
Figure 4:
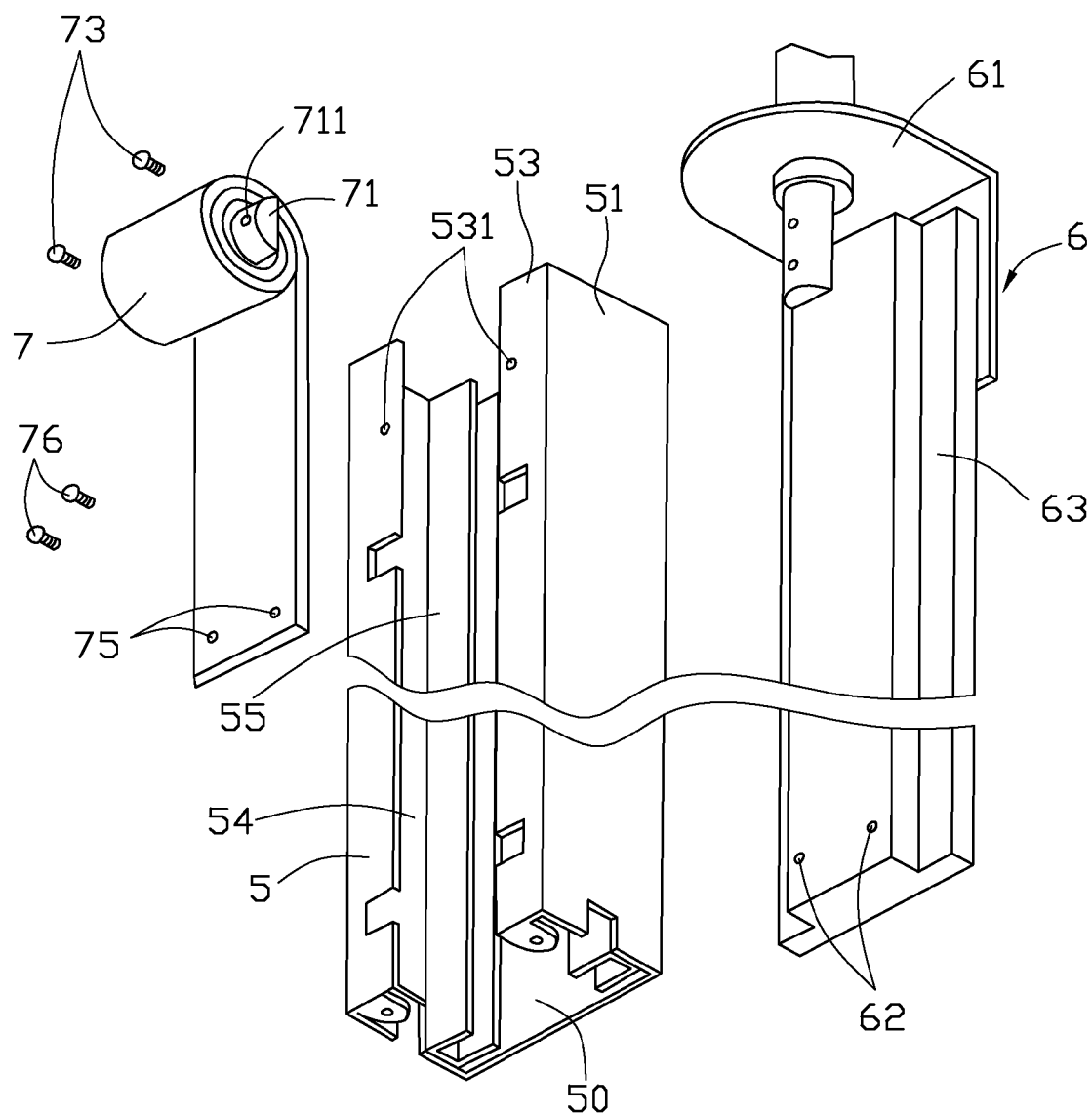
FIG. 4 is an exploded, isometric view of a conventional adjustable stand.

Referring to FIG. 3, the upper support 21 includes a flat sheet 212 and two side sheets 214 formed perpendicularly at opposite sides of the flat sheet 212 correspondingly. The flat sheet 212 defines two connecting holes 216 in a middle portion.

The main support 22 includes a main portion 222 and two sidewalls 223 perpendicularly extending from opposite sides of the main portion 222 correspondingly. Two mounting holes 228 are defined in the sidewalls 223 correspondingly and the mounting holes 228 are aligned in a same line across the main portion 222. Two connecting holes 229 are defined in the main portion 222 of the main support 22 corresponding to the connecting holes 216. When assembled, the upper support 21 is fixed to an end of the main support 22 by a plurality of pivot shafts (not shown).

The movable rack 25 defines two latching holes 252 adjacent one end, four engaging holes 256, and a mounting hole 258. Four connecting members 254 are configured on the movable rack 25 for connecting the movable rack 25 to the support bracket 30.

The adjusting system 26 includes two gear sets (not labeled). For exemplary purpose, only one of the gear sets is detailed. The gear set includes two pivot shafts 262, two washers 264, two pinion gears 266, a rack gear 267, two bearings 268, and two nuts 269. In the exemplary embodiment, two bolts partially threaded at the free end are used as the pivot shafts 262 and connected to movable rack 25 with the nuts 269. When assembled, the pivot shafts 262 are extended through the washers 264, the pinion gears 266 the bearings 268, two engaging holes 256 of the movable rack 25, and the nuts 269 correspondingly, thereby rotatably mounting the pinion gears 266 to the movable rack 25. The rack gear 267 is configured for fixing to the main support 22 and meshing with the pinion gears 266.

The balance mechanism 28 includes two pulley systems 23, a cable 242, a fixing module 29, and a resisting device 27.

For exemplary purpose, only one of the pulley systems 23 is detailed. The pulley system 23 includes a pivot shaft 232, a first washer 233, a wheel 234, a bearing 235, a second washer 237, and a nut 238. The pivot shaft 232 has a first end 2324 and a second end 2336 opposite to the first end 2324. The wheel 234 has a main body 2342 and two flanges 2344 formed at opposite ends of the main body 2342 correspondingly, thus forming a groove (not labeled) around a circumference of the wheel 234. When assembled, the first end 2324 of the pivot shaft 232 is inserted through the first washer 233, the wheel 234, the bearing 235, the second washer 237, and engaged with the nut 238, in that order, thereby forming the pulley system 23. The fixing module 29 includes a coil spring 292, two washers 295, a bearing 296, and a shaft 297. The coil spring 292 is schematically shown in figures. When assembled, the bearing 296 is received in the coil spring 292 and sleeved on the shaft 297. Ends of the shaft 297 is fixedly supported in the mounting holes 228 of the main support 22 correspondingly, and also protrudes through the bearing 296 that is fastened to an inner end of the coil spring 292 and the washers 295, in that order, thereby fixing the inner end of the coil spring 292 to the main support 22. An outer end of the coil spring 292 defines two through holes 293. The balance mechanism 28 further includes two fastening members 244. When assembled, the cable 242 is latched to one of the latching hole 252 of the movable rack 25, looped around the wheel 234 of one of the pulley systems 23, looped through the through holes 293 of the coil spring 292 correspondingly, looped around another one of the pulley systems 23 and latched to another of the latching hole 252 correspondingly. The fastening members 244 correspondingly secured to the ends of the cable 242, thus preventing the ends of the cable 242 from slipping and/or sliding out of the latching holes 252.

The resisting device 27 includes a friction member 272, a spacer 274 and a supporting member 276. The supporting member 276 extends out of the movable rack 25. The friction member 272 is configured at the free end of the supporting member 276 after the spacer 274 is sleeved on the supporting member 276. In other words, the spacer 274 is sandwiched between the movable rack 25 and the friction member 272. The friction member 272 contacts with the main support 22, thus creating a friction force between the movable rack 25 and the main support 22. The friction member 272 and the spacer 274 are made of rubber.

When assembled, the pulley systems 23 are assembled as detailed above. The first ends 2324 of the pivot shafts 232 are fastened in the connecting holes 216 of the upper support 21. The pinion gears 266 are fastened to the movable rack 25 as detailed above. The resisting device 27 is mounted to the movable rack 25 as detailed above. The cable 242 is assembled to the movable rack 25, the pulley systems 23 and the coil spring 292 of the fixing module 29 as detailed above. The rack gears 267 are fastened along the two sides of the main support 22 respectively. Then the upper support 21 and the movable rack 25 are coupled to the main support 22, with the side sheets 214 of the upper support 21 and the resisting device 27 mounted to the movable rack 25 facing the main support 22. The upper support 21 is fixed to the main support 22. The second ends 2326 of the pivot shafts 232 engages in the connecting holes 229 of the main support 22. The rack gears 267 engage with the pinion gears 266 correspondingly. The shaft 297 is extended through the main support 22, the bearing 296, and the washers 295, thereby fixing the inner end of the coil spring 292 to the main support 22. Thus, the adjustable stand 20 is assembled. The support bracket 30 is fixed to the movable rack 25, and the base 40 is fixed to a bottom end of the main support 22, thus the stand 10 is assembled. The support bracket 30 is connected to a flat-panel display of flat-panel display device.

The movable rack 25 can adjustably slide relative to the main support 22 via the engagement of the rack gears 267 and the pinion gears 266. As such, a height of the liquid crystal display panel of the display device relative to the base 40 can be adjustably raised or lowered. A coil force provided by the coil spring 292 of the fixing module can counter balance a weight of the movable rack 25 and the support bracket 30 attached with the panel. Furthermore, a friction force is generated between the resisting device 27 and the main support 22. The friction force keeps/maintains the movable rack 25 in a predetermined position.

When the altitude of the display needs to be adjusted, an external force is applied on the display to force the movable rack 25 sliding relative to the main support 22. The external force is released when the display reaches a predetermined altitude. The movable rack 25 together with the display maintains in the predetermined position because a composition force of the elastic force of the coil spring 292, the friction force between the resisting device 27 and the main support 22 equals to the total gravitational force of the movable rack 25, the support bracket 30 and the display.

The pulley systems 23 and the adjusting system 26 are made of plastic. Therefore, the lift mechanism 20 is light and has low manufacturing cost. The gear sets may be only one or more than two. Each gear set may have only one pinion gear 266 or more than two pinion gears 266. The upper support 21 may be omitted. Correspondingly, the pulley systems 23 are mounted on the main support 22 directly.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An adjustable stand for displays, comprising:
  a main support defining two mounting holes;
  a movable rack slidably mounted on the main support, the movable rack defining two latching holes;
  an adjusting system including at least one pinion gear rotatably attached on the movable rack and at least one rack gear fixed to the main support, the at least one pinion gear being meshed with the at least one rack gear; and
  a balance mechanism mounted between the main support and the movable rack for balancing gravity of the movable rack and components fixed relative to the movable rack, the balance mechanism comprising two pulley systems, a cable, and a fixing module; each pulley system comprising a wheel; the fixing module comprising a coil spring and a shaft, the shaft extended through a mounting hole of the main support, the inner end of the coil spring fixed to the main support, an outer end of the coil spring defining two through holes; wherein the cable is latched to one of the latching holes of the movable rack, looped around the wheel of one of the pulley systems, looped through the coil spring, looped around another one of the pulley systems and latched to another of the latching holes correspondingly.

2. The adjustable stand as claimed in claim 1, wherein the at least one pinion gear and the at least one rack gear are made of plastic.

3. The adjustable stand as claimed in claim 1, wherein each pulley system further includes a pivot shaft, a first washer, a bearing, a second washer, and a nut, the pivot shaft has a first end and a second end opposite to the first end, the wheel has a main body and two flanges formed at two ends of the main body, the first end of the pivot shaft runs through the first washer, the wheel, the bearing, the second washer, and engages with the nut, in that order, the fixing module further includes two washers and a bearing, the bearing is received in the coil spring and sleeved on the shaft, the bearing is fastened to an inner end of the coil spring.

4. The adjustable stand as claimed in claim 1, wherein the wheels and the bearings are made of plastic.

5. The adjustable stand as claimed in claim 1, wherein the balance mechanism further comprises a resisting device, the resisting device includes a friction member, a spacer and a supporting member, the spacer defines a hole, the supporting member extends out of the movable rack, the friction member is configured at the free end of the supporting member after the spacer is sleeved on the supporting member.

6. The adjustable stand as claimed in claim 5, wherein the friction member and the spacer are made of rubber.

7. The adjustable stand as claimed in claim 5, wherein the adjusting system further comprises four pivot shafts, four washers, four bearings, and four nut, the pivot shafts run through the washers the pinion gears the bearings, two engaging holes of the movable rack, and the nuts correspondingly.

8. The adjustable stand as claimed in claim 1, wherein the adjustable stand further comprises an upper support fixedly coupled to the main support, the movable rack, the adjusting system and the balance mechanism are disposed between the main support and the upper support.

9. The adjustable stand as claimed in claim 8, wherein the main support includes a main portion and two sidewalls formed perpendicularly at opposite sides of the main portion, the at least one rack gear is fixed at the sidewalls of the main support, and the upper support is fixed at one end of the main support.

10. The adjustable stand as claimed in claim 1, wherein the number of the at least one pinion gear is four and the number of at least one rack gear is two, the rack gears are disposed opposite to each other, and each rack gear meshes with two of the pinion gears.

11. A support stand comprising:
a support bracket for mounting a display panel;
a base; and
an adjustable stand adjustably connected to the support bracket, and mounted on the base, the adjustable stand comprising:
a main support defining two mounting holes;
a movable rack slidably mounted on the main support, the movable rack defining two latching holes;
an adjusting system including at least one pinion gear rotatably attached on the movable rack and at least one rack gear fixed to the main support, the at least one pinion gear meshing with the at least one rack gear; and
a balance mechanism mounted between the main support and the movable rack for balancing gravity of the movable rack and components fixed relative to the movable rack, the balance mechanism comprising two pulley systems, a cable, and a fixing module, each pulley system comprising a wheel, the fixing module comprising a coil spring and a shaft, the shaft running through a mounting hole of the main support, the inner end of the coil spring fixed to the main support, an outer end of the coil spring defining two through holes, wherein the cable is latched to one of the latching holes of the movable rack, looped around the wheel of one of the pulley systems, looped through the coil spring, looped around another one of the pulley systems and latched to another of the latching holes correspondingly.

12. The support stand as claimed in claim 11, wherein the at least one pinion gear and the at least one rack gear are made of plastic.

13. The support stand as claimed in claim 11, wherein the wheels and the bearings are made of plastic.

14. The support stand as claimed in claim 13, wherein the balance mechanism further comprises a resisting device, the resisting device includes a friction member, a spacer and a supporting member, the spacer defines a hole, the pivot shaft runs through and engages with a mounting hole of the movable rack, the spacer, and then engages in the friction member, in that order.

* * * * *